R. F. STEWART.
WRAPPING MACHINE.
APPLICATION FILED JAN. 5, 1912.
1,062,262.
Patented May 20, 1913.
6 SHEETS—SHEET 1.
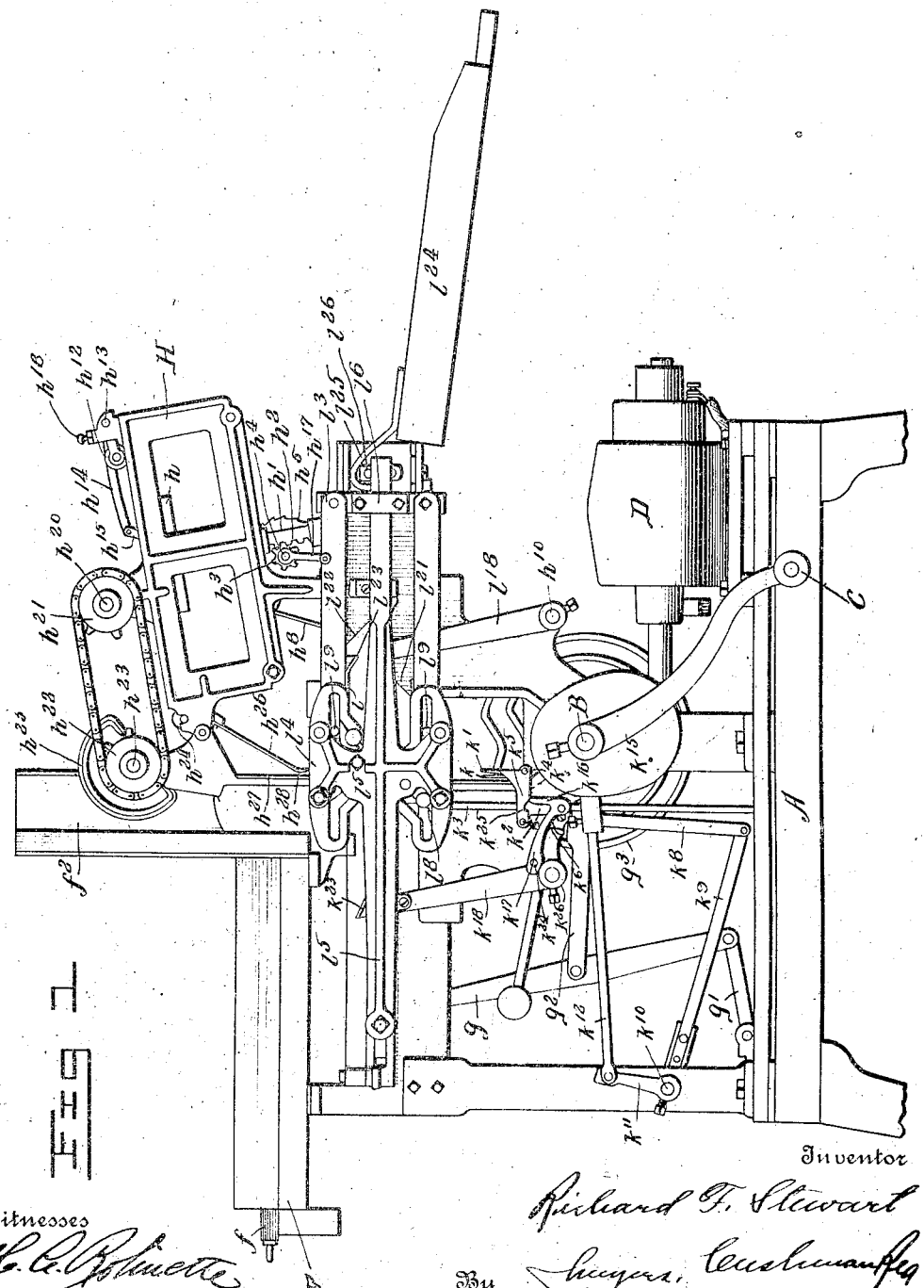
Witnesses
H. C. Johnette
G. M. Stucker.
Inventor
Richard F. Stewart
By Sneyers, Cushman & Co.
Attorney

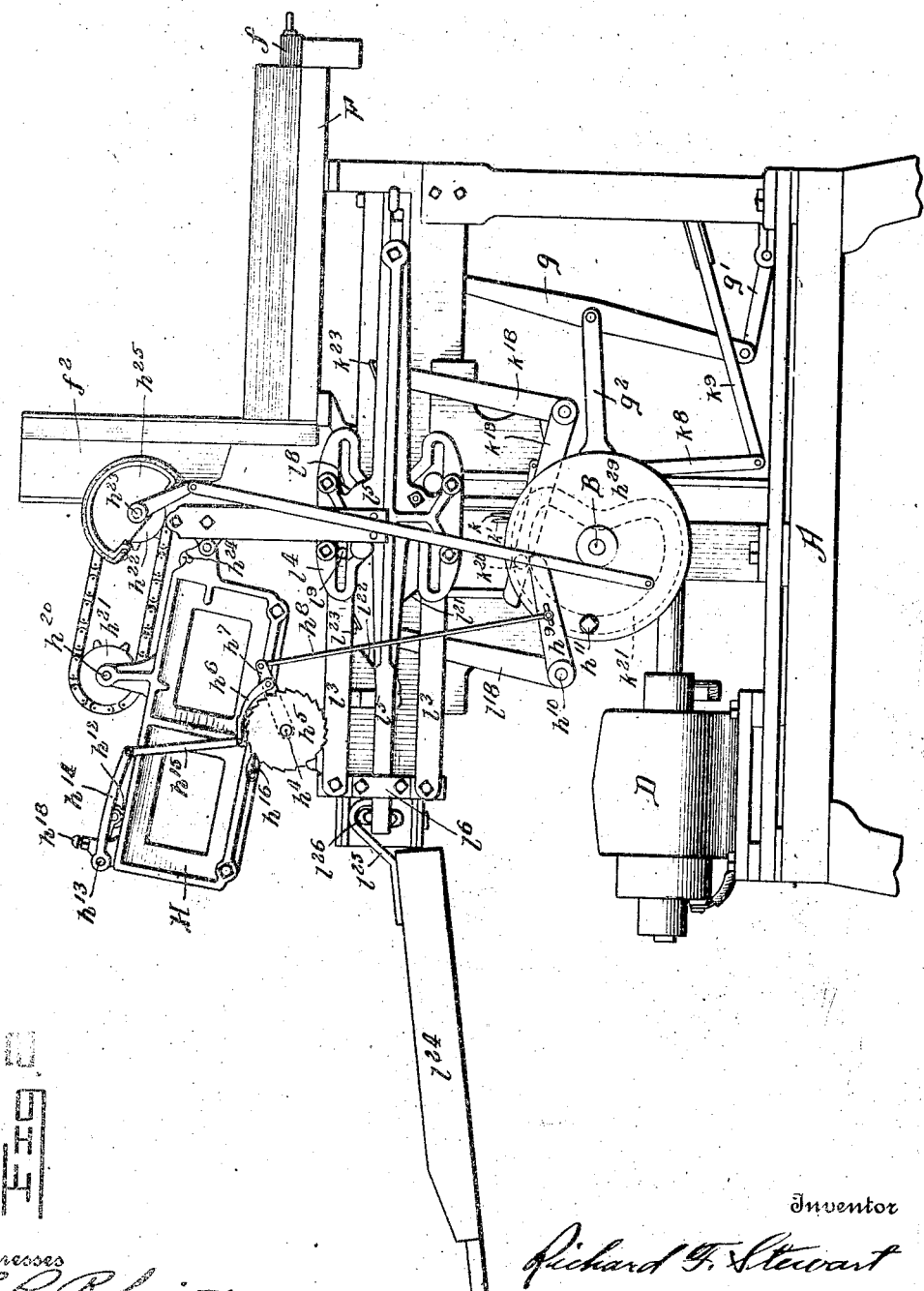

R. F. STEWART.
WRAPPING MACHINE.
APPLICATION FILED JAN. 5, 1912.
1,062,262.
Patented May 20, 1913.
6 SHEETS—SHEET 3.
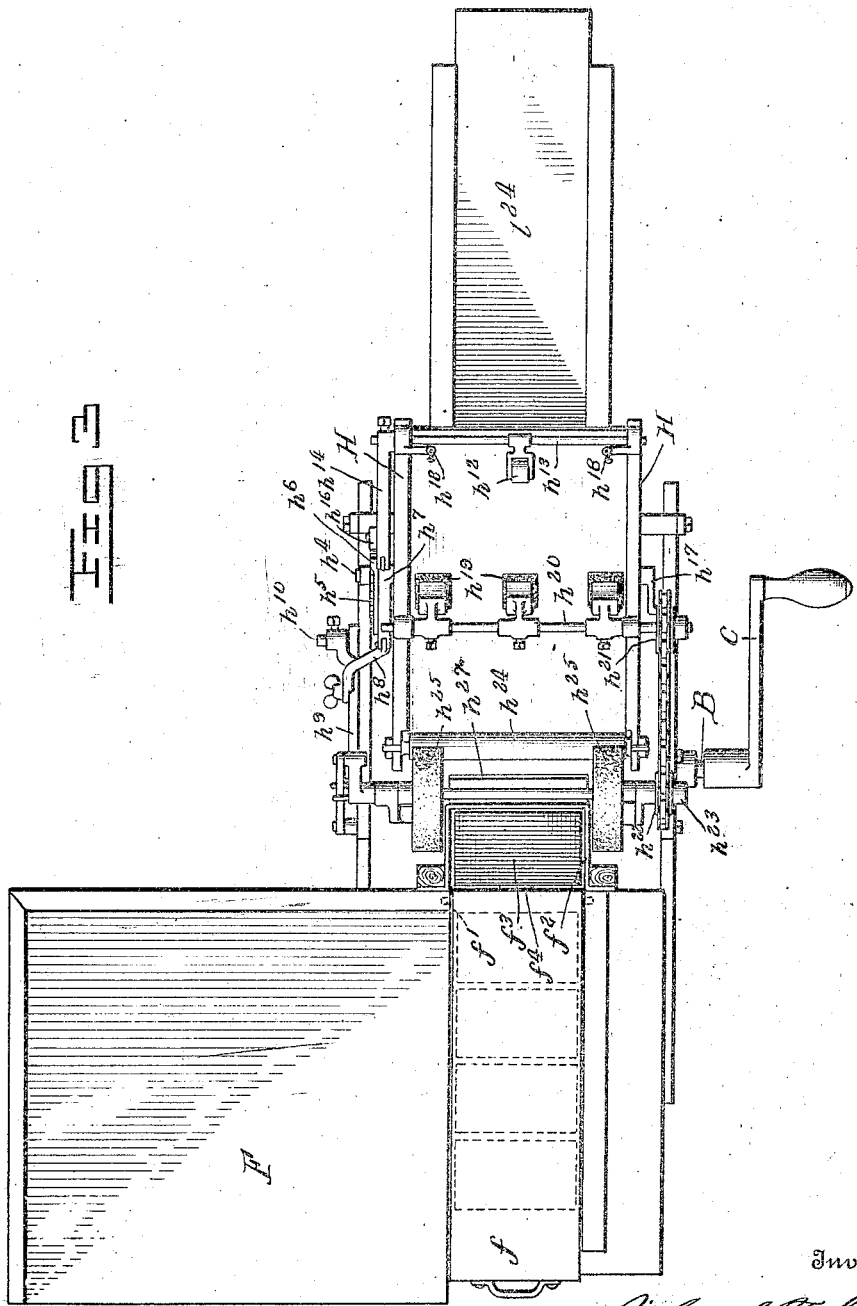

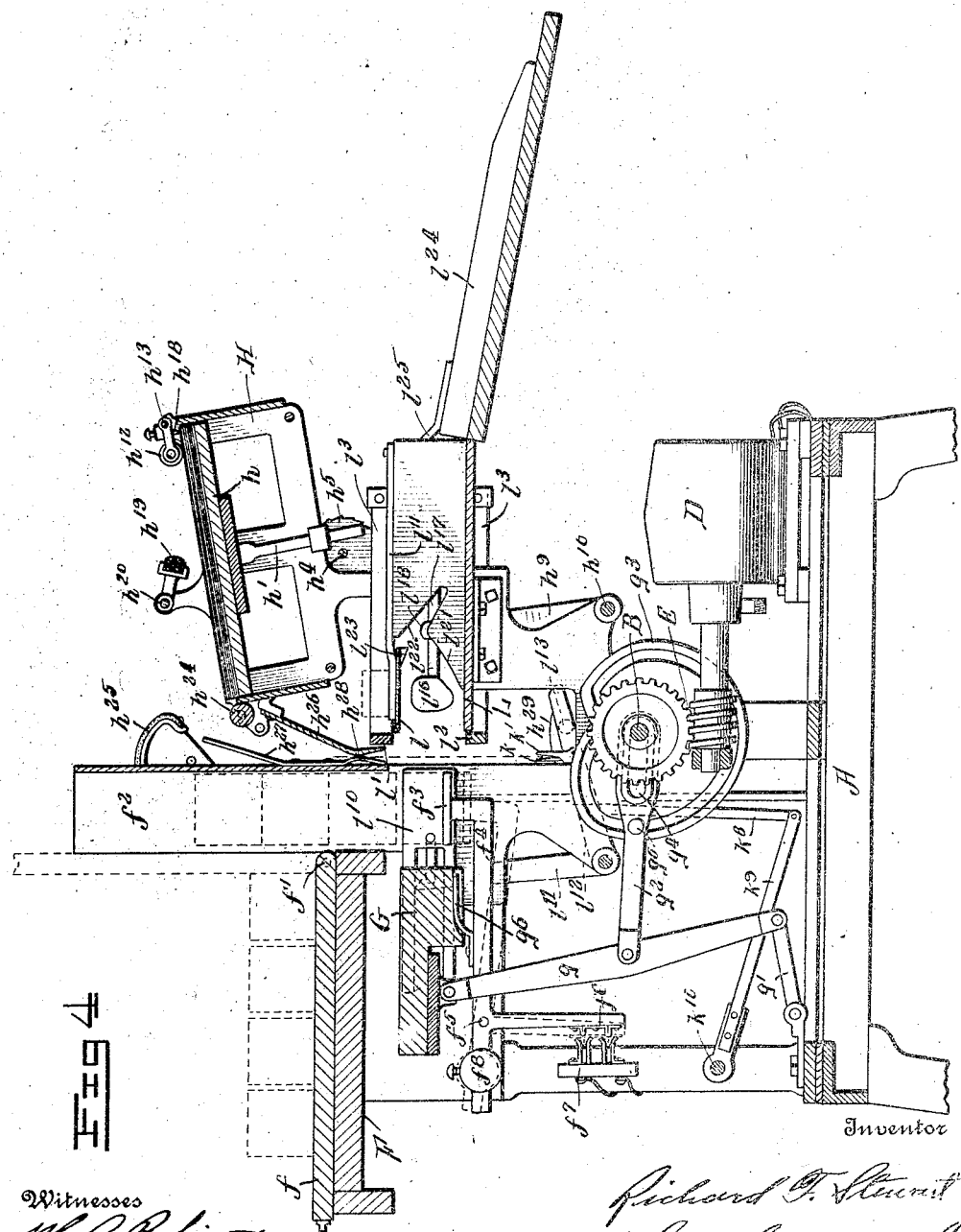

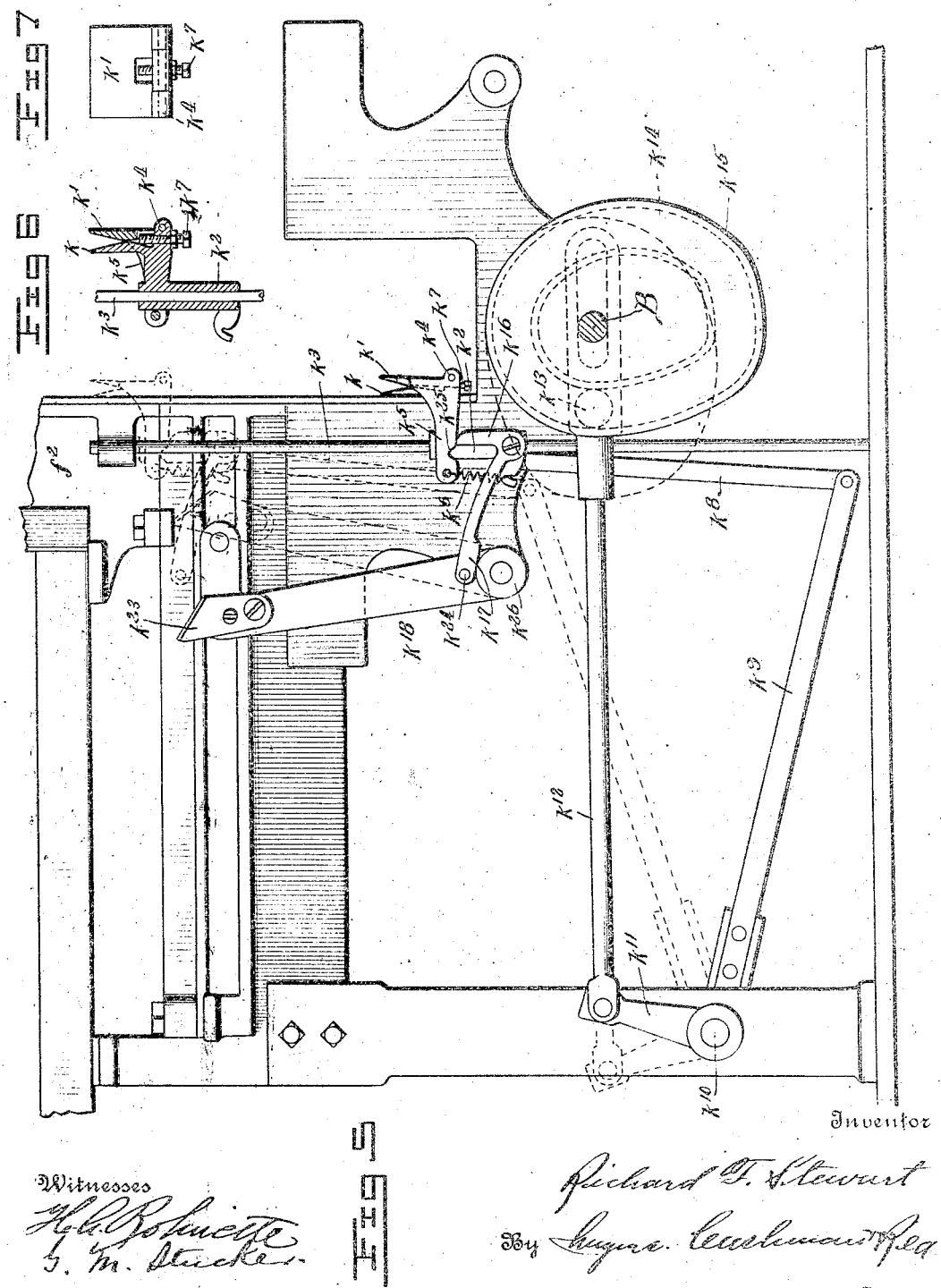

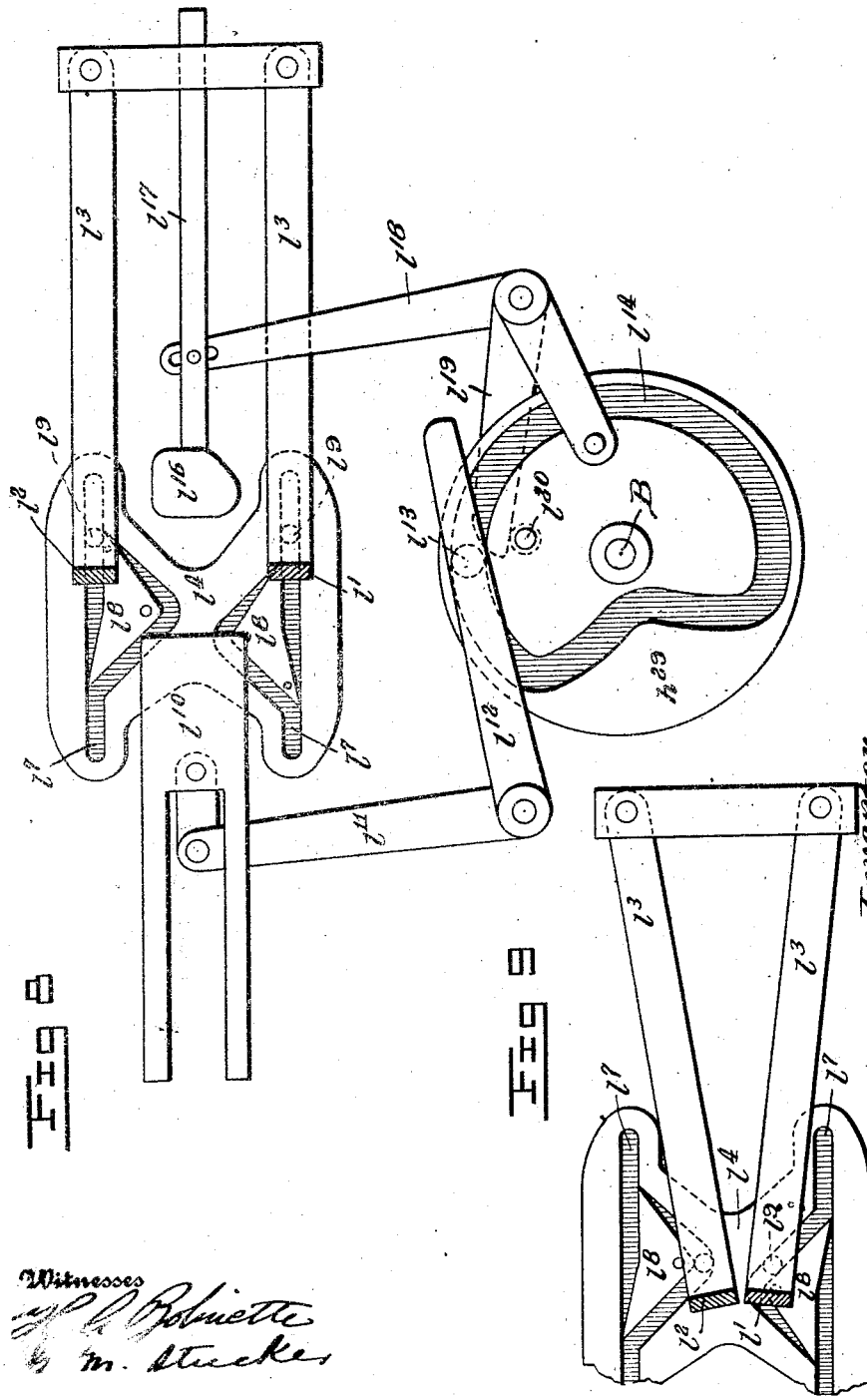

UNITED STATES PATENT OFFICE.

RICHARD F. STEWART, OF BRIARCLIFF MANOR, NEW YORK.

WRAPPING-MACHINE.

1,062,262.  Specification of Letters Patent.  Patented May 20, 1913.

Application filed January 5, 1912. Serial No. 669,606.

*To all whom it may concern:*

Be it known that I, RICHARD F. STEWART, a citizen of the United States, residing at Briarcliff Manor, in the county of Westchester and State of New York, have invented new and useful Improvements in Wrapping-Machines, of which the following is a specification.

The present invention relates to wrapping machines, and has for its object to provide a machine in which commodities to be wrapped may be fed, wrapped and delivered automatically without the necessity of handling after once they have been placed in the machine.

In the present embodiment of the invention shown, I have illustrated and shall describe it as a machine for wrapping prints of butter, but it will be understood that it is not confined to this particular commodity, but may be used for wrapping any commodity with such mechanical variations as may be desirable without departing from the spirit of my invention, and all such mechanical variations as are obvious expedients or substantial equivalents of the devices shown and described are, of course, within the range of my invention.

In order that the invention may be further understood by those skilled in the art, I have illustrated in the accompanying drawings the preferred embodiment of the invention, in which drawings:—

Figure 1 is a side elevation of a machine embodying my invention. Fig. 2 is a side elevation taken from the opposite side of the machine from that shown in Fig. 1. Fig. 3 is a plan view of the machine shown in Figs. 1 and 2. Fig. 4 is a sectional view lengthwise of the machine and substantially upon the longitudinal center thereof. Fig. 5 is a detail view somewhat enlarged of a portion of the machine sufficient to show the sheet gripper and its operating mechanism. Figs. 6 and 7 are sectional and elevational views respectively of the sheet gripper. Figs. 8 and 9 are detail views enlarged to show folders for handling the wrappers and laying them about the article being wrapped.

Referring to the drawings by letters, like letters indicating like parts in the several views. A denotes the table or frame for the machine. Mounted in suitable supporting standards rising from the table A is the main shaft B for driving the several mechanisms, which shaft may be conveniently driven by any suitable means, as manually by the handle C, or mechanically by the motor D, the motor when used being geared in any suitable manner, as by the worm and gear connection E, shown in Fig. 4. The said power shaft B is provided with suitably plotted operating cams for imparting movement to the several mechanisms of the machine in properly timed relation, and reference will be made to these cams in connection with the particular mechanism which they operate.

*The print feed.*—Prints of butter are placed on a receiving board or table F, best shown in Fig. 3, where they are conveniently arranged for the purpose of supplying the machine, and adjacent said table F is a print feeding board $f$ onto which the prints may be slid from the table F in any number within the capacity of the board, as for example six, and this may be done without the necessity of the operative touching the prints at all, for it will be understood that as the trays of prints are brought from the cutting machine and deposited on the table F, they may be then slid by any suitable means from their position on the table F to the board $f$.

The board $f$ is hinged at $f'$ adjacent the feed hopper $f^2$ of the machine, and is provided with a lifting handle at its opposite end by which it may be swung on its pivots. The board $f$ when swung upwardly to the dotted line position shown in Fig. 4 will deliver its load of prints to the hopper, so that they will stand in a pile in the hopper $f^2$, when the board $f$ may be lowered to its normal position to receive the next charge of prints from the table F.

The pile of prints in the hopper $f^2$ will rest upon a movable bottom board or table $f^3$ carried by an arm $f^4$ pivoted to the frame of the machine at $f^5$, as shown in Fig. 4, and weighted at its outer end so as to hold the table $f^3$ normally in the position shown in full lines in Fig. 4. The said arm $f^4$ carries a make and break arm $f^6$ operatively placed with respect to an electric switch $f^7$ which controls the circuit through the motor D, so that when the machine is motor driven the table $f^3$ will control the motor, starting it when there are prints in the hopper $f^2$ to depress it, and cutting it out when the hopper is emptied and the table is raised by the overbalancing weight on the arm $f^4$. This weight $f^8$ is adjustable so as to give an accurate balancing of the table $f^3$ and its arm $f^4$ under all conditions.

The prints in the hopper $f^2$ are delivered from the bottom of the pile by means of a push plate or plunger G, mounted in ways in the machine frame, and operated by means of a lever $g$ linked in its lower end by a connection $g'$ to the machine frame. The said lever $g$ is connected by a cam rod $g^2$ with an operating cam $g^3$ on the main shaft B, this cam rod being forked or looped as at $g^4$ about the main shaft and supported thereby, and being provided with a cam roll or pin $g^5$ engaging a suitable cam groove in the cam plate $g^3$, this cam being so plotted as to give to the mechanism just described a quick forward feeding movement and return to the plunger G with a sufficient dwell between the return and feed to permit the wrapping mechanism, presently to be described, to perform its work on the delivered print prior to the feeding forward of the next one.

When the machine is driven by the electric motor, and the cut out device heretofore described is in position, it is of course essential that the table $f^3$ shall not rise prior to the return of the plunger G to its initial position, as shown in Fig. 4, and to accomplish this I provide means whereby the table $f^3$, after the last print has been fed from the hopper, cannot lift until the plunger G has made its full return. This means, as shown, comprises a finger $g^6$ secured to the table support $f^4$ and engaging a groove or depression in the bottom of the plunger G, as best shown in Fig. 4. When there is butter in the hopper resting on the table $f^3$ this finger $g^6$ is, of course, disengaged from the groove in the plunger G, and as the plunger returns after pushing the last print from the table $f^3$ the table will rise and the finger enter the groove in the plunger G so as to permit the table to move to its raised position and operate the cut out to stop the motor. It will be observed that the plunger G however will bear against the finger $g^6$ as it moves forward, and maintain it and the arm $f^4$ with the table $f^3$ depressed until the plunger G has made its full return, so that whether or not there is sufficient weight on the table $f^3$ to prevent the cut out device from being operated, the table cannot rise until the plunger G has made its return and is out of the way, and preferably the parts will be so positioned as that the table $f^3$ will rise and the cut out be operated just before the plunger G reaches its extreme rearward position on its return, thereby preventing the momentum of the driven parts doing more than effect the full return of the plunger G, and eliminating all danger of the plunger being carried forward by reason of this momentum.

*The wrapper feeding mechanism.*—Mounted on the side of the hopper opposite to the feeding table and board just described, is the wrapper stack supporting and feeding means, best shown in Figs. 1, 2 and 4. The stack holding box comprises an open frame H suitably supported from the machine frame, having within it a movable bottom $h$ supported by two legs $h'$, one on either side. One of these legs, shown in Fig. 1, has a rack $h^2$ which is engaged by a gear $h^3$ on a shaft $h^4$, said shaft having at its opposite end a ratchet wheel $h^5$. The said ratchet wheel $h^5$ is operated by means of a pawl $h^6$ mounted on a swinging arm $h^7$ pivoted concentrically with the center of the ratchet wheel and connected by a rod $h^8$ with a swinging arm $h^9$ carried by shaft $h^{10}$ journaled in the machine frame. The said swinging arm $h^9$ is so placed as to be engaged by a cam roll $h^{11}$ on the cam $h^{20}$, so that through these connections the ratchet wheel will be operated once every revolution of the main shaft, and under normal conditions will step up the ratchet wheel $h^5$, rotate the shaft $h^4$, and gear wheel $h^3$ and lift the table $h$ through the rack $h^2$ and the table supporting arms. It will thus be seen that an intermittent lift is given to the table, but it is obvious that this lift must be varied to meet the needs of the stack, neither advancing it too fast nor lagging behind so that the feed will not be uniform, and it is necessary to provide automatic controlling means for this ratchet feeder of the table. This means comprises a pivoted feeler roll $h^{12}$ carried by suitable rock shaft $h^{13}$ journaled in the stack frame and having at one end an arm $h^{14}$ connected by link $h^{15}$ with the ratchet arm $h^7$. With this arrangement it will be seen that as soon as the stack has been lifted through the ratchet, pawl, and gear mechanism, the feeler roll $h^{12}$ and shaft $h^{13}$ will be rocked, and through the arm $h^{14}$ and link $h^{15}$, the pawl $h^6$ will be lifted out of engagement with the ratchet $h^5$ and will so continue until the feed from the stack permits the feeler roll $h^{12}$ to fall sufficiently to permit engagement of the pawl and ratchet. Preferably a pawl $h^{16}$ will be provided to prevent any accidental reverse movement of the ratchet $h^5$ and lowering of the stack, and I contemplate also providing the shaft $h^4$ with a crank arm $h^{17}$ (see Fig. 1) by means of which the stack supporting board $h$ may be run up and down manually when desired.

As best shown in Fig. 4 the stack of wrappers will normally lie in the position shown the upper sheets at least of the stack be pierced and held by means of suitable points $h^{18}$ adjustably mounted in lugs on the wrapper box, the pins serving to hold the sheets from accidentally slipping from the top of the stack because of the inclination of the stack, and yet offering no material resistance to the pulling off of the top wrapper as it is mechanically fed. This mechanical feeding of the wrapper is accomplished by the pull of fingers $h^{19}$, of which any desirable number may be used, three being shown in the present instance, these fingers being preferably provided with a suitable friction material, as sponge rubber, so as to insure a sufficient frictional grip to move the wrapper. The fingers $h^{19}$ are adjustably mounted on a shaft $h^{20}$ (see Fig. 3), said shaft being journaled in lugs on the top of the wrapper box, and having at one end a sprocket wheel $h^{21}$ having a chain connection with a sprocket wheel $h^{22}$ on a shaft $h^{23}$ mounted in bearings near the inner or delivery end of the wrapper box so that as the shaft $h^{23}$ is rotated the shaft $h^{20}$ with its feeding fingers $h^{19}$ will be operated and the top wrapper will be slid off of the stack and fed forward from the box onto a roll $h^{24}$ at the forward end of the box where it will be caught by the friction surface of the two feeding segments $h^{25}$ and carried downward over an apron $h^{26}$, a sheet directing guard or plate $h^{27}$ being provided in front of the apron to direct the forward edge of the wrapper upon the feed downwardly. The wrapper will be thrust down between the bite $h^{28}$ of the guard $h^{27}$ and the apron $h^{26}$, as best shown in Fig. 4, and will be there lightly gripped and suspended ready to be seized by the gripper which will now be described.

*The sheet gripper.*—The sheet gripping mechanism comprises two jaws $k$, $k'$, one of which jaws $k$ is carried by a sleeve $k^2$ sliding on a supporting rod $k^3$, while the jaw $k'$ is pivoted at $k^4$ to the first named jaw, and has a projecting arm $k^5$ connected by a spring $k^6$ to a fixed lug on the sleeve $k^2$ so as to be normally under tension with the jaws in closed or gripping position. Movement of the jaw $k$ may be regulated by means of a screw $k^7$ (see Figs. 6 and 7) which is adjustable to and from a notched wall in the movable jaw $k'$ so as to limit the swing of the jaw $k'$ and regulate its grip relative to the fixed jaw $k$.

The sleeve $k^2$ is raised and lowered on its rod $k^3$ by means of a link $k^8$ and lever $k^9$, said lever $k^9$ being carried by a rock shaft $k^{10}$, which through the arm $k^{11}$ and cam roll $k^{12}$ is oscillated at regular intervals from the cam roll $k^{13}$ which engages a cam groove $k^{14}$ in the cam $k^{15}$ mounted on the main shaft B of the machine, and preferably the cam rod $k^{12}$ will be forked or looped on the main shaft B for support. The timing is such that the wrapper feeding mechanism above described, and the sheet gripping mechanism just set forth will so coöperate as to bring the sheet gripper to its upper dotted line position, as shown in Fig. 5 just as the wrapper feed delivers a sheet from the stack down the throat of the machine. The grippers $k$, $k'$ are normally held open by means of a dog $k^{16}$, the nose of which engages the underside of the arm $k^5$ of the movable jaw of the gripper, and holds it away from the other jaw against the stress of the spring $k^6$. The dog $k^{16}$ is pivoted on the sleeve $k^2$ and has an operating arm $k^{17}$. As the gripper is thrust upwardly through the mechanism just described, the jaws will be open and will so remain until the lower edge of a wrapper has dropped between them. At this point and before the gripper starts downwardly, the arm $k^{18}$, which is pivoted to the machine frame and operated through the arm $k^{19}$ having a cam roll $k^{20}$ engaging a groove $k^{21}$ in the cam $h^{29}$ mounted on the main shaft B, swings forward to the dotted line position shown in Fig. 5, and then swings back to its full line position. The arm $k^{18}$ carries at its upper end a shoe $k^{23}$ so positioned as to engage a pin $k^{24}$ on the arm $k^{17}$ as the arm $k^{18}$ swings back, depressing the arm $k^{17}$ and throwing the nose of the dog $k^{16}$ into line with the notch $k^{25}$, whereupon the spring $k^6$ will pull the arm $k^5$ down, throw the jaws of the gripper together, and grasp the depending end of the wrapper. The gripper then descends to the full line position, shown in Fig. 5, whereupon the arm $k^{17}$ strikes the hub $k^{26}$ of the arm $k^{18}$ throwing the nose out of the notch and separating the jaws, as shown.

*The wrapper folding mechanism.*—At this point in the operation of the machine the wrapper will be held suspended from the light spring grip of the guard plate $h^{27}$ and the apron $h^{26}$ across the path of movement of the print, and as the plunger G heretofore described pushes the print from the pile and off the table, the advancing print will engage the wrapper and thrust it across the throat of the machine into a folding chute L so that the print with the wrapper laid about its top, side and bottom will lie between the chute L and a top plate $l$ (see Fig. 4) and in position for completion of the wrapping. The said top plate $l$ is mounted on a yielding bar $l''$ so as to bear lightly on the article, and may, if desired, be weighted, as shown in dotted lines to increase the pressure. The folding of the wrapper about the opposite side of the print is accomplished by two folding bars $l'$, $l^2$, shown in detail in Figs. 8 and 9, said folding bars being connected to arms $l^3$ pivoted, as shown in Fig. 1, to the machine frame. The said folding bars $l'$, $l^2$ are operated by means of a switch plate $l^4$ which is carried by a frame $l^5$ connected at one end to the plunger G, the other end of the frame $l^5$ reciprocating in a support $l^6$ at the other end of the machine. The said switch plate $l^4$ is provided with tracks $l^7$ and switch blocks $l^8$, which blocks are weighted at one side so as to normally lie in the full line position shown in Fig. 8, and one of the switch blocks and tracks (the lower one in the present showing) is slightly advanced so as to give the lower bar $l'$ a slight lead over the upper bar $l^2$. As the switch plate $l^4$ is reciprocated the tracks $l^7$ will traverse the pins $l^9$, and as the pin $l^9$ on the lower bar $l'$ traverses the track $l^7$ during the reciprocating movement of the switch block $l^4$ it will alternately pass beneath the switch $l^8$ and then over the top of that switch, this resulting in a raising and dropping of the folding bar $l'$ as its pin traverses the triangular path formed by the track in the switch plate, and the bar will lay the lower fold of the wrapper. The upper bar $l^2$ operates in identically the same way, except that as above stated it lags a little behind the first bar so as to properly effect the lapping of the wrapper. That is, the lower fold is first laid against the print of butter, and then the upper fold is laid in lapped condition over the first fold. Immediately this side folding of the wrapper is effected the end folding operation begins, and this end folding is effected by the folding slides $l^{10}$ which lie one on either side of the plunger G within the hopper $f^2$, these folding plates $l^{10}$ being actuated by the lever $l^{11}$, which in turn is actuated by the cam lever $l^{12}$ having a cam roll $l^{13}$ engaging a cam groove $l^{14}$ in the cam $h^{29}$ on the main shaft B. The plates $l^{10}$ are thrust forward past either end of the print about which the wrapper has been laid and make the initial end folds, the opposite end folds being effected by the plates $l^{16}$ carried by the slide rods $l^{17}$, which rods are operated by the arm $l^{18}$ connected with a cam lever $l^{19}$ operated from a cam roll $l^{20}$ on the cam $h^{29}$, the timing being such that these end folds for the sides of the wrapper will be made in close relation to each other, the plates $l^{10}$ operating slightly in advance of the plates $l^{16}$.

The top and bottom folds for the wrapper ends are effected by the wall of the chute through which the wrapper prints are forced by the succeeding prints, and as shown in Fig. 4 as the print passes along the table L, the bottom end fold will be formed by means of the incline $l^{21}$, which will gradually turn up the projecting end flat against the end of the print, and directly thereafter the top end fold will be formed by the incline $l^{22}$ down which the end fold will ride until the end fold is laid flat against the end of the print, and preferably I provide the top plate $l$ of the chute with turning fingers $l^{23}$ which initiate or start the top end fold as the print moves along in readiness for engaging the incline $l^{22}$.

From the chute or print box the wrapped prints slide to a tray or board $l^{24}$ which is preferably inclined so as to insure the prints sliding down easily and prevent offering too much resistance and consequent pressure to the advancing prints thrust forward by the plunger, and preferably this board $l^{24}$ will be made, as shown, with suspending hooks $l^{25}$ engaging lugs $l^{26}$ on the machine frame so that when the tray $l^{24}$ is full it may be conveniently lifted with its load and without the necessity of handling the goods, and taken to the packing cases or to storage.

From the foregoing it will be seen that by use of this machine prints may be expeditiously handled and wrapped without the necessity of the operative touching the prints with his hands, and that the machine being bulk fed, as distinguished from machines in which single prints are fed, will be entirely automatic in the matter of supplying, wrapping and delivering prints so long as the hopper is kept loaded; so it is entirely possible for a single operative to handle a number of machines, and should the hopper supply become exhausted the machine will automatically cut out the power and come to a stand still only to start up again when a fresh supply has been placed in the hopper. Furthermore, handling of the paper is done away with, for the machine once supplied with a stack will automatically feed its wrappers until the supply is exhausted.

Having thus described the invention what I claim as new is:—

1. In a machine of the class described, the combination of the following instrumentalities: article feeding means, wrapping mechanism, a feeding hopper, a feed board operable to deliver a stack of articles to said hopper, and a receiving table adjacent said feed board.

2. In a machine of the class described, the combination of the following instrumentalities: article feeding mechanism, wrapping mechanism, means for driving said mechanisms, start and stop mechanism for said driving means, a feeding hopper, means in said hopper controlled by the hopper contents to operate said start and stop mechanism, and means to prevent the stopping of said driving means except when said article feeding mechanism is in a retracted position.

3. In a machine of the class described, the combination of the following instrumentalities: article feeding mechanism, wrapping mechanism, means for driving said mechanisms, electric start and stop mechanism for said driving means, a feeding hopper, an electric switch controlling said start and stop mechanism, and a movable bottom said hopper having connection with said switch to actuate said start and stop mechanism.

4. In a machine of the class described, the combination of the following instrumentalities: article feeding mechanism, wrapping mechanism, means for driving said mechanisms, start and stop mechanism for said driving means, a feeding hopper, a movable bottom in said hopper, a pivoted arm secured to said movable bottom and controlling said start and stop mechanism, and means on said arm coöperating with said article feeding mechanism to prevent stopping of the driving means except when said article feeding mechanism is in retracted position.

5. In a machine of the class described, the combination of the following instrumentalities: article feeding mechanism, wrapping mechanism, means for driving said mechanisms, start and stop mechanism for said driving means, a feeding hopper, a movable bottom in said hopper, a weighted pivoted arm supporting said movable bottom, means carried by said arm for controlling said start and stop mechanism, and a projection on said arm to engage said article feeding mechanism and prevent movement of said arm and stopping of the driving means except when said article feeding mechanism is in retracted position.

6. In a machine of the class described, the combination of the following instrumentalities: a feeding plunger, plunger feeding mechanism, wrapping mechanism, means for driving said mechanisms, start and stop mechanism for said driving means, a feeding hopper, a movable bottom in said hopper, a pivoted arm supporting said movable bottom and controlling said start and stop mechanism, and a finger projecting from said arm and adapted to engage a recess in said plunger when the plunger is in a predetermined position to permit the automatic stopping of said driving means.

7. In a machine of the class described, the combination of the following instrumentalities: an article feeding plunger, plunger feeding mechanism, wrapping mechanism, means for driving said mechanisms, start and stop mechanism for said driving means, a feeding hopper, a movable bottom in said hopper, a pivoted arm supporting said movable bottom and arranged beneath said plunger, a finger projecting upwardly from said arm in the path of said plunger and adapted to enter a recess in said plunger when the latter is in a predetermined position, and connections from said arm to said start and stop mechanism.

8. In a machine of the class described, the combination of the following instrumentalities: article feeding mechanism, wrapping mechanism, an electric motor for driving said mechanisms, start and stop devices for said motor, a feeding hopper, means in said hopper operable by the articles therein controlling said start and stop mechanism, and means carried by said article feeding means to prevent operation of the start and stop mechanism except when said article feeding mechanism is in a predetermined position.

9. In a machine of the class described, the combination of the following instrumentalities: a plunger for feeding articles to be wrapped, means for supplying a wrapper across the path of travel of the article fed by the plunger, a receiving chute to which said article and wrapper is delivered, side folding bars to lap the rear ends of the wrapper about the article, and a reciprocating switch block having a double trackway for said bars adapted to operate said folding bars in sequence.

10. In a machine of the class described, the combination of the following instrumentalities: a plunger for feeding articles to be wrapped, means for supplying a wrapper across the path of travel of the article fed by the plunger, a receiving chute to which said article and wrapper is delivered, pivotally mounted side folding bars adjacent said folding chute, and a switch block having offset bar operating tracks to effect the operation of one of said folding bars slightly in advance of the other.

11. In a machine of the class described, the combination of the following instrumentalities: a plunger for feeding articles to be wrapped, means for supplying a wrapper across the path of travel of the article fed by the plunger, a receiving chute to which said article and wrapper is delivered, side folding bars to lap the rear ends of the wrapper about the article, and a switch block having bar operating tracks and bar controlling switch points offset from each other to effect the operation of one of said bars slightly in advance of the other.

12. In a machine of the class described, the combination of the following instrumentalities: an article feeding plunger, wrapper supplying means adapted to deliver a wrapper across the path of travel of the article, a folding chute to which said article is delivered having a yielding top, and end folding inclines on said yielding top.

13. In a machine of the class described, the combination of the following instrumentalities: an article feeding plunger, wrapper supplying means adapted to deliver a wrapper across the path of travel of the article, a folding chute, a yielding top for said chute, end folding inclines on said yielding top, and inclines in the sides of said chute to complete the end folding.

14. In a machine of the class described, the combination of the following instrumentalities: article feeding means, wrapper supplying means, a folding chute, folding instrumentalities coöperating with said chute to fold the wrapper about the article, and an inclined removable tray supported wholly upon and extending outwardly from the end of said chute.

In testimony whereof I have hereunto set my hand in presence of two subscribing witnesses.

RICHARD F. STEWART.

Witnesses:
WILLIAM A. PRATT,
KATHERINE C. GLANVILLE.